Oct. 27, 1936.　　　O. M. WOLFF　　　2,059,163
FRUIT PITTING MACHINE
Filed Nov. 16, 1934　　　2 Sheets-Sheet 1

INVENTOR.
OSCAR M. WOLFF.
By Glascock Downing & Seebold
ATTORNEYS.

Oct. 27, 1936.   O. M. WOLFF   2,059,163
FRUIT PITTING MACHINE
Filed Nov. 16, 1934   2 Sheets-Sheet 2

INVENTOR.
OSCAR M. WOLFF.
By Glascock Downing & Seebold
ATTORNEYS.

Patented Oct. 27, 1936

2,059,163

UNITED STATES PATENT OFFICE 2,059,163

FRUIT PITTING MACHINE

Oscar M. Wolff, Chicago, Ill.

Application November 16, 1934, Serial No. 753,386

8 Claims. (Cl. 146—27)

This invention concerns fruit pitting machines, and more particularly fruit pitting machines for use with olives in which the olives are pitted preparatory to filling them with some other edible material.

The objects of this invention are to provide improved means of removing the pits from the fruit to minimize the waste of the fruit material, to perform the operation with greater speed and to improve the appearance of the fruit when pitted. Other objects will appear as the description of the invention proceeds.

The invention will be thoroughly understood from the following specification and the drawings annexed thereto, in which.

Figure 1:
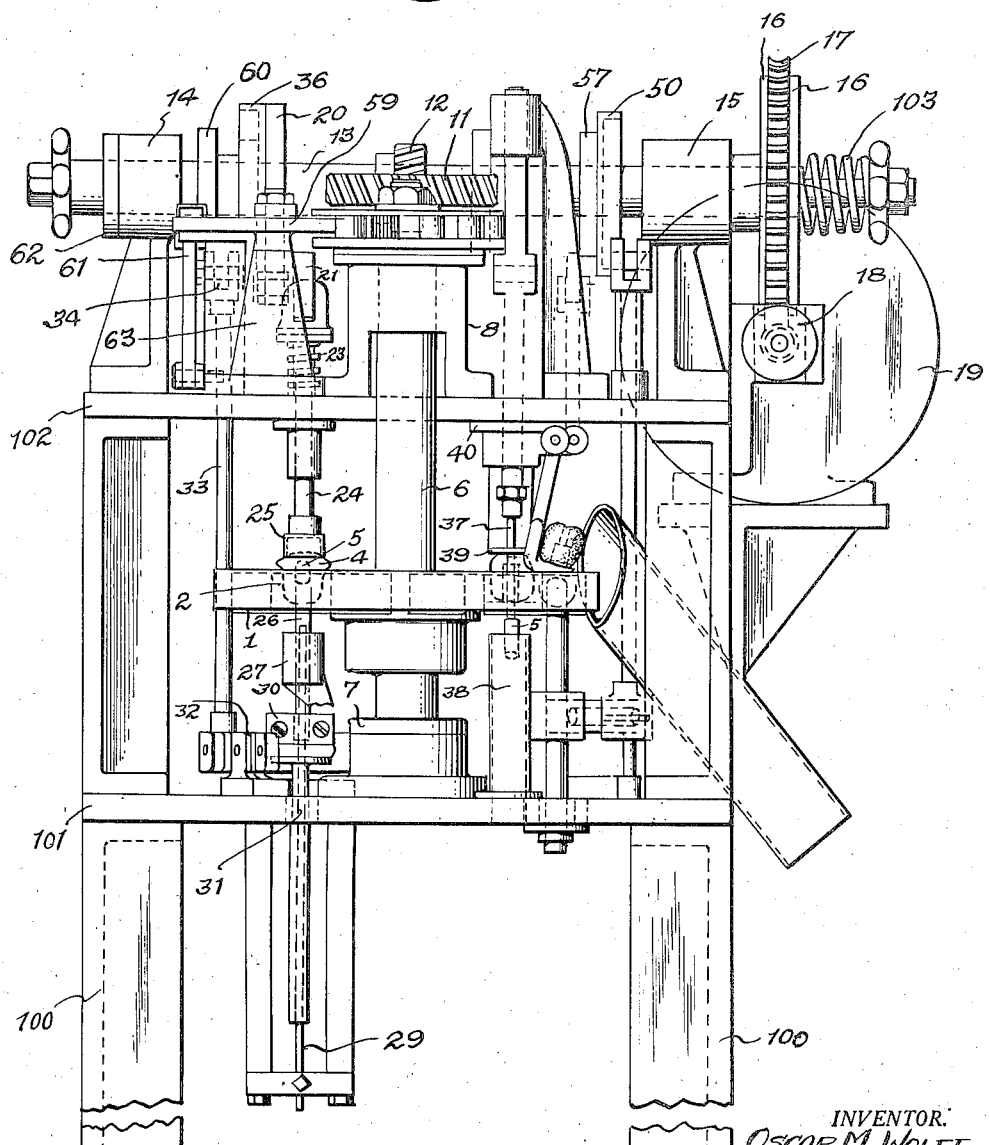
Figure 1 is a front view.

The device for pitting the fruit is mounted upon a frame comprising columns 100, supporting platforms 101 and 102 and aligned bearings 14 and 15. A shaft 13 is rotatably mounted on the bearings 14 and 15. Said shaft is driven by the following mechanism:

A worm gear 17 is rotatably mounted upon the shaft 13 and on either side thereof friction wheels 16 are mounted so as to rotate with the shaft, the outer one at least being slidable upon the shaft. A spring 103 surrounds the shaft and bears upon the outer friction wheel. Worm gear 17 is thus yieldably connected with the friction wheel and the shaft 13. Worm gear 17 meshes with a worm 18 which is driven by a motor diagrammatically shown at 19.

Shaft 13 is the source of power of all moving parts of the machine. For the transmission of this power a number of cams 60, 36, 20, 43, 50, 57, are formed on or rigid with said shaft as also is a helical gear wheel 12.

A shaft 6 is rotatably mounted in bearings 7 and 8 on platforms 101 and 102.

Helical gear 12 meshes with and drives gear 11 on shaft 11'. On the same shaft is fixed a wheel 10 having a number of teeth, two as shown. These teeth mesh with the pins of the wheel 9 and the shaft 6 is thus rotated step by step, the arc of each step being the arc between the centers of successive pockets in the fruit carrying table hereinafter described. The gearing connecting the shaft 6 with the shaft 13 is so proportioned that for each revolution of the shaft 13 the shaft 6 is rotated through the above defined arc.

The fruit carrying table 1 is supported fixedly on shaft 6 and has pockets, in this instance 12, equally spaced from each other and adjacent the periphery. Each pocket has an apertured bottom for a purpose to appear hereinafter.

Figure 2:
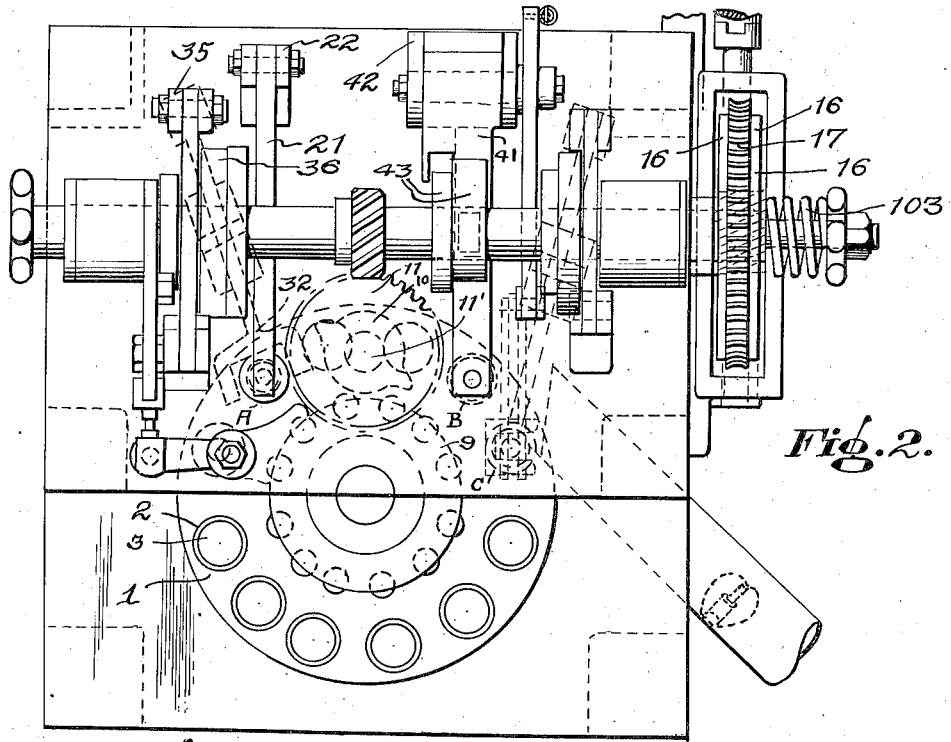
Fig. 2 is a top plan view.
Figure 3:
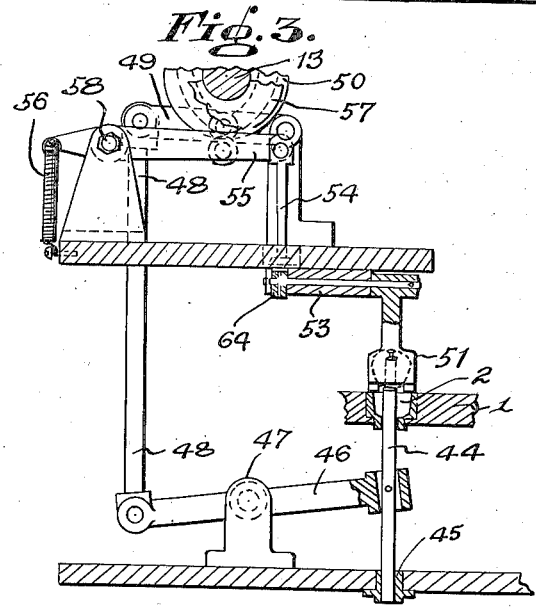
Fig. 3 is a view partly in section showing details of the fruit expelling device.
Figure 4:
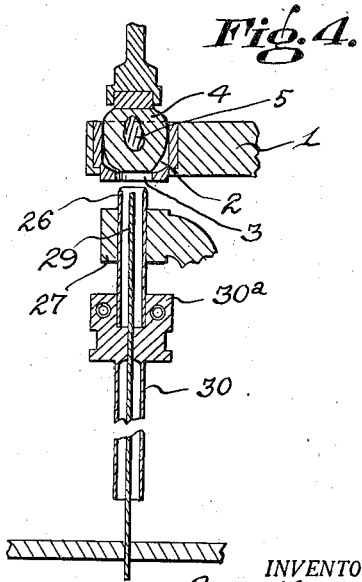
Fig. 4 is a sectional view of the cutting knife and adjacent parts.

Three positions of any individual pocket may be called the active positions (indicated on Fig. 2 as A, B, and C), because it is in these positions only that any action on the fruit takes place, the fruit passing idly from one active position to another. It is understood of course that at any given moment there is a fruit in each of the three positions and the action on each of the three pieces of fruit goes on simultaneously. The fruit is placed in the exposed pockets at the front of the machine, (see Fig. 2).

In order that the fruit carrying table may be steady in its position when not being rotated by the wheel 10, a locking pawl 59 is pivoted on a bearing post 63 and is moved by a cam 60 on shaft 13 through double roller cam arm 61 and link 62. The locking action of this pawl 59 is timed to take place on the release of index wheel 9 from toothed wheel 10.

Beneath the pocket in position A is a standard 21. A reciprocating member 30 having a split collar 30a, has a circular knife 26 sharply beveled internally and externally, mounted in split collar 30a and guided in its reciprocation by standard 21. Rigidly secured below platform 101 is a rod passing through member 30 but not reciprocating therewith and terminating almost at the level of the upper edge of the knife when the latter is in its lower position. Member 30 with the knife 26 is reciprocated, the former being guided in bearing 31, by lever 32 which is secured to connecting rod 33, the rod 33 being reciprocated by cam roller arm 34 pivoted in bearings 35 and moved by box cam 36 which is mounted on shaft 13. The upward movement of knife 26 is, by suitable proportioning of the parts, limited to bring the knife substantially level with the bottom of the pit of the fruit which is seated in the pocket of the carrying table.

The provision of the split collar 30a in which the hollow cylindrical knife 26 is mounted is important as it enables the operator to substitute knives of different sizes to suit the fruit to be operated upon.

In line with, and above the pocket in position A is a plunger 24 passing through a bearing on platform 102 and having collars on each side of said bearing. A spring 23 encircles plunger 24 and bears against platform 102 and the upper collar of plunger 24 thereby normally holding the plunger in its upper position. A cam roller arm 21 is pivoted in bearing 22 while its other end is above and in line with plunger 24. Face cam 20, on shaft 13 acts during a part of its revolution through arm 21 to compress spring 23 and lower plunger 24 into contact with fruit carrying table 1. Plunger 24 has at its lower end a soft rubber cushion 25, which presses down on the fruit in the pocket. The operation of position A is as follows: Shaft 13 revolving wheel 10 moves one pocket away from, and the succeeding pocket into position A. Locking pawl 59 moves into locking position, knife 26 rises and cuts from the fruit, firmly held by cushion 25, a cylinder of pulp extending only to the bottom of the pit of the fruit. Knife 26 is withdrawn bringing with it the pulp cylinder cut out, said pulp cylinder on the downward movement of the knife encounters the stationary rod 29 and is expelled from the knife.

Plunger 24 has been released and spring 23 has raised it. Another projection on wheel 10 engages index wheel 9 and moves the fruit pockets one step.

Simultaneously the operation at position B has taken place. Above the pocket at position B is a rod 37, guided in bearing 40 and reciprocated by cam roller arm 41 pivoted in bearing 42. Cam roller arm 41 is actuated by positive double cam 43 and forces rod 37 through the fruit expelling the pit through the channel left by knife 26 and through the hole 3 in the bottom of the pocket. Beneath position A is a guiding tube 38 to receive the falling pit. To free the fruit from the rod 37 a stripper plate 39 is supported from the frame just above the pocket. The rod 37 is withdrawn by the continued revolution of the cam and the operation at B being completed the fruit carrying table is moved another step as before described.

Beneath the pocket in position C is a rod 44, which is reciprocated in bearing 45 by a lever 46, pivoted at 47. A rod 48 connects the other end of lever 46 to cam roller arm 49 operated by box cam 50 on shaft 13.

Just above the pocket is a finger 51 for removing the fruit after its ejection from the pocket. Finger 51 is pivoted in bearing 53 and is connected by arm 64 and rod 54 to cam roller arm 55 pivoted at 58. To the short arm of 55 is fixed a spring 56, the other end of which is secured to the frame. Spring 56 actuates the arm 55 when the latter is released by cam 57 to throw finger 51 outwardly. A tube 52 is provided to receive the fruit thrown outwardly by finger 51. At the C position of the pocket it will be seen from the above, the fruit is ejected upwardly from the pocket by rod 44 and thrown into tube 52 to be carried by gravity to a suitable receiver.

I claim:

1. In a fruit pitting machine, means for holding the fruit in one position, a hollow knife of closed curved outline for cutting and withdrawing a plug of the fruit extending from the surface to one end of the pit of the fruit, means for reciprocating said knife between a point outside the fruit and the pit of the fruit while the fruit is held in said position, and automatic means for releasing the fruit and moving it to a second position, reciprocating means acting on the opposite end of the pit expelling it through the aperture formed by the reciprocating knife while the fruit is held in the second position, and automatic means for releasing the fruit from its second position.

2. The device as claimed in claim 1 in which the means for holding the fruit in position comprises a plunger having a soft rubber cushion on the end to press against the fruit.

3. The device as claimed in claim 1 in which a stationary stripper is mounted within said knife to expel the plug withdrawn from the fruit on the outward movement of said knife.

4. The device as claimed in claim 1 in which said knife is mounted in a split bushing of adjustable diameter.

5. The device as claimed in claim 1 in which the means for holding the fruit in position comprises a table, pockets in said table, a plunger above one of said pockets and means for actuating said plunger to hold said fruit in the pocket beneath the plunger.

6. A device for pitting fruit, comprising a shaft means for rotating said shaft and yieldable connections therebetween, a second shaft and means for intermittently rotating said second shaft by said first mentioned shaft, a fruit carrying table having pockets therein mounted on said second shaft, each step of the intermittent rotation moving each pocket to the former position of the adjacent pocket ahead of it, means actuated from said first mentioned shaft and acting simultaneously while the fruit carrying table is at rest for cutting and withdrawing a plug extending from the surface to the pit of the fruit in one of said pockets and expelling the plug from the knife, reciprocating means acting on the opposite end of the pit for forcing the pit out of the fruit in another pocket through the aperture thus made, means for expelling the fruit from a third pocket and means for discarding the fruit from the device when expelled from said third pocket.

7. In a device for pitting fruit, a fruit carrying table, means for intermittently rotating said table, means for holding said table rigid when not rotated, fruit holding pockets in said table circularly arranged adjacent the periphery, means for removing a plug from fruit in one pocket, said plug extending from the surface to the pit of the fruit, and reciprocating means for forcing the pit by pressure on the opposite end of the pit out of the fruit through the channel formed by the removal of said plug, said last-named means acting on the fruit when its pocket has been moved to another position.

8. In a device for pitting fruit, means for forming a channel in the fruit from the surface to the pit by withdrawing a plug of the fruit, comprising a hollow knife, means acting on the end of the fruit opposite the knife holding the fruit in position, means for reciprocating said knife while the fruit is held in position and separate means comprising a reciprocating plunger acting on the opposite end of the pit for thereafter expelling the pit from the fruit through the channel.

OSCAR M. WOLFF.